United States Patent [19]
Johnson

[11] 4,003,047
[45] Jan. 11, 1977

[54] EMERGENCY EXIT LATCH
[75] Inventor: Philip C. Johnson, South Bend, Ind.
[73] Assignee: Revere Copper and Brass, Inc., New York, N.Y.
[22] Filed: Mar. 21, 1975
[21] Appl. No.: 560,737
[52] U.S. Cl. .................. 340/274 R; 340/52 R; 200/61.68; 180/112
[51] Int. Cl.² ........................................ G08B 13/08
[58] Field of Search ............... 340/274, 275, 52 R; 292/202, 241, DIG. 33; 200/61.62, 61.64, 61.68, 318; 180/111, 112

[56] References Cited
UNITED STATES PATENTS

| | | | |
|---|---|---|---|
| 3,005,065 | 10/1961 | Jellies | 200/61.62 |
| 3,415,961 | 12/1968 | Barnard | 200/61.64 |
| 3,603,958 | 9/1971 | Wahlberg | 340/274 |
| 3,746,382 | 7/1973 | Hancock | 292/241 |

FOREIGN PATENTS OR APPLICATIONS 1,242,104    0000    Germany ................... 292/202

*Primary Examiner*—John W. Caldwell
*Assistant Examiner*—William M. Wannisky
*Attorney, Agent, or Firm*—Pennie & Edmonds

[57] ABSTRACT

An emergency exit latch is disclosed for locking and unlocking a portal such as a window or door and sending a signal to a remote point when the portal has been unlocked. The latch includes a latch operator which is rotatably mounted on the portal. The latch operator includes a tang which is integral with the operator and performs a locking function by mating with means associated with the frame when the latch operator is rotated into the locked position. When the operator is put in the locked position, the tang also actuates a switch. Thus, when the operator is rotated out of the locked position, the switch changes state and provides an indication that the door is no longer properly locked. In the preferred embodiment, the design of the exit latch is such that the switch will change state even before the window has become completely unlocked.

6 Claims, 3 Drawing Figures

EMERGENCY EXIT LATCH

BACKGROUND OF THE INVENTION

1. Field of the Invention

The present invention relates to a latch especially well suited for locking a hinged window in the closed position. The inventive latch includes an electrical switch which is actuated when the latch is released. This makes the latch particularly useful for employment in emergency escape portals such as windows, doors, or hatches.

The emergency exit latch constructed in accordance with the present invention may be advantageously used in a number of applications, such as public conveyances, school buses, recreational vehicles, or any other application requiring the use of an emergency signal when a portal is opened. When the latch is operated, the switch associated with the latch is actuated. This condition may be sensed by appropriate circuitry and used to drive an emergency indicator which would notify the vehicle's operator of the condition.

2. Description of the Prior Art

In the past, when it was desired to provide a portal with a warning to indicate that a window was unlocked, the problem was solved by directly coupling an electrical switch to the window. For example, in the case of a bus window of the type which is latched on the bottom and hinges from the top, a simple push-button switch was mounted adjacent the top of the window in such a manner that when the window is properly secured in the frame, the window itself would depress the actuating element of the switch. Thus, when the window became unlocked, it would swing open from the bottom, insofar as in this situation it is secured only at the top portion of its frame. If the window were to swing open a sufficient amount, it would move to a position where it would no longer actuate the switch and would signal the operator of a dangerous condition. Although the provision of such a switch results in some improvement over a window without any safety feature, this technique suffers from a number of inadequacies. For example, the switch is not actuated until the window is actually unlocked and begins to swing about dangerously. It is even possible that the window may become unlatched and swing about without notifying the operator of the condition due to the fact that it does not swing out enough to actuate the switch.

SUMMARY OF THE INVENTION

According to the invention, an emergency exit latch is provided for selectively locking or unlocking a portal such as a window or a door which is mounted within a frame and for selectively operating a warning device which signals whether the latch is locked or unlocked. The latch comprises an elongated operator member rotatably mounted on the portal. The latch further comprises tang means which is secured in angular relation to the elongated member for rotation therewith. A tang receiving member is affixed to an adjacent portion of the frame and is constructed, arranged, and configured to lockingly receive the tang means when the operator member is rotated to a first locked position. The tang receiving member also permits exit of the tang when the operator is rotated to a second unlocked position. The inventive latch further comprises switch means having first and second states for controlling a signal capable of actuating the warning device. The switch means is positioned in such a manner that the rotation of the elongated member to a locked position causes the switch to assume one of its states while rotation to an unlocked position causes the switch to assume the other of its states, thereby providing selective operation of the warning device.

When it is desired to open the window, the latch is rotated, thereby rotating the tang out of the lock and reversing the state of the switch. In the preferred embodiment the tang may be in a position where it is still in the slot and the window is not free to open though the state of the switch has changed. Thus, the fact that the tang has been removed from the lock and that the window is thereby partially unlocked is signaled by the switch, thereby affording the operator the opportunity to lock the window without exposing the vehicle to the danger of a completely unlocked window. Further rotation of the latch results in rotating the tang out of the slot, thereby unlocking the window.

In the preferred embodiment, an electrical switch is actuated by the tang and is used to actuate a suitable warning device which may most conveniently take the form of an electrical light. However, it is noted that other switch and other warning devices may be used such as, for example, a pneumatic switch and a pneumatically operated horn.

BRIEF DESCRIPTION OF THE DRAWINGS

The preferred embodiment of the invention is described hereinbelow with reference to the drawings wherein.

DETAILED DESCRIPTION OF THE PREFERRED EMBODIMENT

Figure 1:
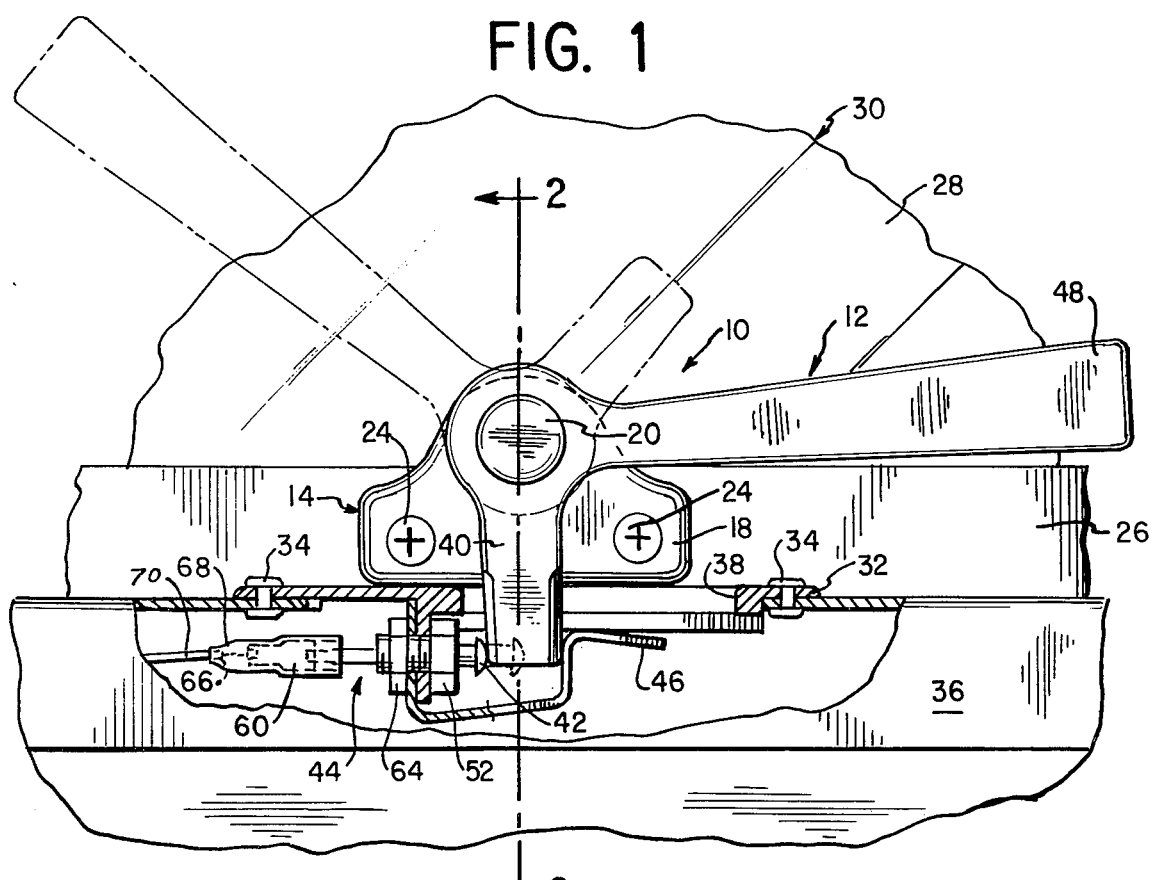
FIG. 1 is an elevational view of a latch constructed in accordance with the present invention showing the latch in the locked and an unlocked position.
Figure 2:
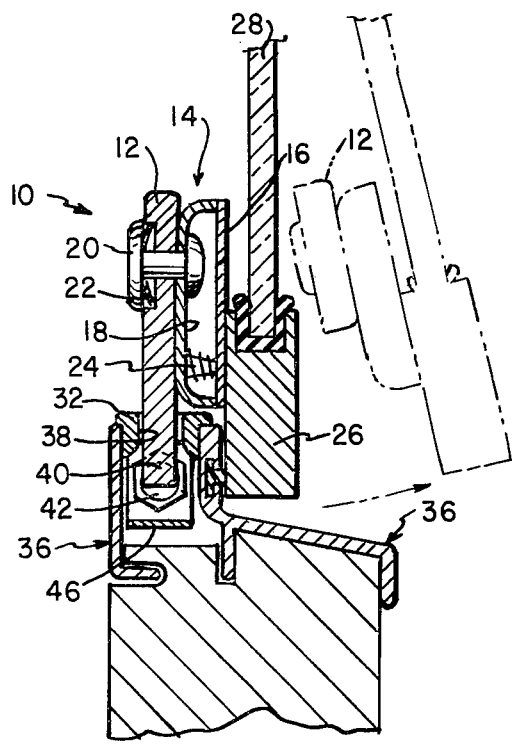
FIG. 2 is a cross-sectional view along line 2—2 of FIG. 1.

Referring to FIGS. 1 and 2, the latch 10 is illustrated in solid lines in the locked position. Latch 10 includes a latch operator 12 and is rotatably mounted on a support 14. Support 14 comprises a plate 16 and a housing 18. The latch is rotatably supported by a rivet 20 and held in place by a washer 22. Support 14 is secured by a pair of screws 24 to the window rim 26 which supports the pane of glass 28 in window frame 36. Mating element 32 includes a slot 38 through which the tang portion 40 of latch operator 12 extends. In this position, tang 40 is in contact with the actuating foot 42 of a switch 44 whose operation will be detailed below. Latch operator 12 is kept in this position by a spring lock 46 which is made of spring metal and is secured to mating element 32. Latch operator 12 includes a handle portion 48 which extends from the center of rotation in angular relation to the tang portion. When it is desired to open the window, the handle portion 48 of latch operator 12 is rotated counterclockwise to the position shown in FIG. 3, deflecting the spring lock 46 and then rotated further to the position shown in phantom lines in FIG. 1.

Figure 3:
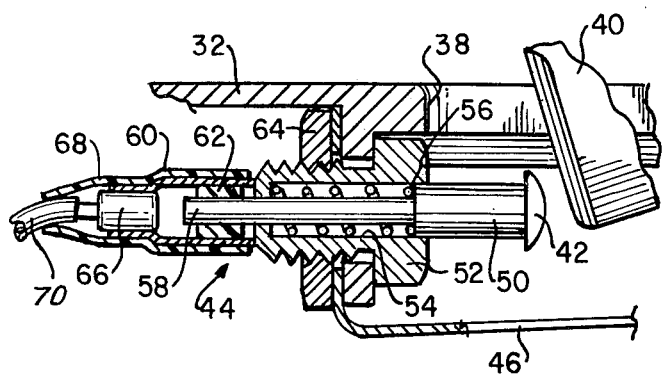
FIG. 3 is a view of the latch when the handle is in a position where the latch is still partially locked but the switch is actuated.

In the position illustrated in FIG. 3, the electrical switch 44 is opened, thereby signaling the operator that the latch has been opened. It is noted that the window is not free to open when it is in the position illustrated in FIG. 3 since tang 40 is still in slot 38. When the handle 48 is further rotated to the position shown in phantom lines in FIG. 1, the window is then free to swing open as is illustrated in phantom lines in FIG. 2.

The operation of switch 44 is illustrated in FIG. 3. Foot 42 is mounted on tubular member 50 which is slidably supported in switch housing 52 which includes a bore 54. A spring 56 urges foot 42 to the position illustrated in FIG. 3. Further advancement of the foot is blocked by rod 58 disposed in bore 54 and a stop 60. Stop 60 is secured to rod 58 by insulator 62. Switch 44 is secured to mating element 32 by a bolt 64. A wire 66 is in electrical contact with stop 60 through lug 68. The entire assembly is protected by insulator 70. In the position illustrated in FIG. 3, an electrical path extends from wire 66 through lug 68 and stop 60 to housing 52 and thus the chassis of the vehicle. However, in the locked position, as is illustrated in solid lines in FIG. 1, tang 40 depresses foot 72, thereby electrically disconnecting housing 52 from stop 60. Thus, when latch handle 48 is rotated to the position shown in FIG. 3 and wire 66 is grounded, this condition is detected by appropriate circuitry.

The existence of an open circuit or a short circuit between wire 66 and the chassis thus serves as an indication of the state of the switch. Thus, when the latch handle 48 is rotated to the position shown in FIG. 3, suitable alarm apparatus is actuated via wire 66, thereby informing the operator of the vehicle that the latch is at least partially open. The circuitry may simply be the series combination of a battery and an alarm which is connected between the chassis and wire 66.

What is claimed is:

1. An emergency exit latch for selectively locking and unlocking a portal, such as a window or a door, which is mounted within a frame, and adapted for selectively operating an early warning device, which comprises:
    a. a locking device comprising an elongated operator member configured to be gripped by an operator and tang means secured in angular relation thereto, said locking device being pivotally attached to said portal for rotation;
    b. tang receiving means securely affixed to a frame portion adjacent said locking device when said portal is in a closed position comprising:
        i. a base section defining an opening configured to selectively receive said tang means; and
        ii. resilient locking means secured to said base section adjacent the opening thereof and positioned, dimensioned, and configured for selectively lockingly receiving at least a portion of the tang means when the locking device is rotated to a locking position, said resilient means engageably retaining said operator member and tang means in said locked position;
    c. switch means mounted on the frame adjacent to said tang receiving means comprising an activating member having first and second positions, said first position providing a signal capable of deactivating said warning device and said second position providing a signal capable of activating the warning device, said switch means being positioned such that when the portal is in the closed position, rotation of the locking device to the locked position provides corresponding rotation of said tang means, and continued rotation produces engagement of said tang means with said activating member to change the position of said activating member to deactivate said warning device, and rotation of said locking device to an unlocked position causes the tang means to rotate out of engagement with the activating member to activate the warning device, said tang means and tang receiving means being respectively dimensioned and configured such that the warning device is activated prior to complete withdrawal of said tang means from said tang receiving means.

2. The emergency exit latch according to claim 1 further comprising a switch having a housing and an activating member extending therefrom, said activating member being biased toward a first position corresponding to an activated warning device.

3. The emergency exit latch according to claim 2 further comprising a spring means adapted to resiliently bias said activating member toward said first position.

4. The emergency exit latch according to claim 1, wherein said switch means is a mechanically actuated electrical switch.

5. The emergency exit latch according to claim 1, wherein said switch means comprises:
    a. a housing secured to said tang receiving member, said housing defining a bore therethrough;
    b. an elongated member slidably supported in said bore and having a portion extending away from said housing;
    c. resilient means disposed in engaging relation to at least a portion of said elongated member and adapted for urging said member toward a first position in which a first end portion of the member is spaced from the housing;
    d. an insulating member secured to the other end of said elongated member;
    e. a conductive stop member positioned whereby the action of said resilient means in urging forward said elongated member is limited by the abutment of the conductive stop against the body of the switch to provide electrical contact between said body and said stop means; and
    f. an electrical conductor secured to said stop means for connection to an external circuit for conducting electrical signals to the warning device.

6. The emergency exit latch switch according to claim 3 wherein said resilient locking means is in the form of a metal strip configured to maintain said tang means in a predetermined locked position, said resilient locking means having a portion adapted to be resiliently deflected by said tang means when said locking device is rotatably displaced to one of at least two positions.

* * * * *